United States Patent
Rao et al.

(10) Patent No.: US 10,264,060 B1
(45) Date of Patent: Apr. 16, 2019

(54) AUTOMATED LOAD BALANCING FOR PRIVATE CLOUDS

(71) Applicant: EMC Corporation, Hopkinton, MA (US)

(72) Inventors: Vinay G. Rao, Bangalore (IN); Ian Wigmore, Westborough, MA (US); Stephen D. Smaldone, Woodstock, CT (US); Gabriel Benhanokh, Tel Aviv (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 210 days.

(21) Appl. No.: 15/197,850

(22) Filed: Jun. 30, 2016

(51) Int. Cl.
*H04L 29/08* (2006.01)
*G06F 17/30* (2006.01)
*H04L 12/26* (2006.01)

(52) U.S. Cl.
CPC ...... *H04L 67/101* (2013.01); *G06F 17/30979* (2013.01); *H04L 43/0882* (2013.01); *H04L 67/1097* (2013.01)

(58) Field of Classification Search
CPC ... H04L 67/101; H04L 67/1097; H04L 43/08; G06F 17/30
See application file for complete search history.

(56) References Cited

U.S. PATENT DOCUMENTS 9,256,381 B1 * 2/2016 Fultz ............... G06F 3/0611

* cited by examiner

*Primary Examiner* — Glenford J Madamba
(74) *Attorney, Agent, or Firm* — Krishnendu Gupta; Jason Reyes; Anne-Marie Dinius

(57) ABSTRACT

A system, computer program product, and computer-executable method of balancing Input/Output (I/O) loads for cloud data storage systems including a plurality of hosts and a plurality of data storage arrays, the system, computer program product, and computer-executable method including monitoring, via a first host of the plurality of hosts, a status of a first data storage array of the plurality of data storage arrays, upon detecting a performance issue with the first data storage array, notifying a cloud manager of the first data storage array, wherein the cloud manager is in communication with each of the plurality of hosts and each of the plurality of data storage arrays, monitoring, via the cloud manager, the performance issue, and determining, via the cloud manager, whether to move at least one LUN from the first data storage array.

6 Claims, 11 Drawing Sheets

Update Configuration

AUTOMATED LOAD BALANCING FOR PRIVATE CLOUDS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of balancing Input/Output (I/O) loads for cloud data storage systems including a plurality of hosts and a plurality of data storage arrays, the system, computer program product, and computer-executable method including monitoring, via a first host of the plurality of hosts, a status of a first data storage array of the plurality of data storage arrays, upon detecting a performance issue with the first data storage array, notifying a cloud manager of the first data storage array, wherein the cloud manager is in communication with each of the plurality of hosts and each of the plurality of data storage arrays, monitoring, via the cloud manager, the performance issue, and determining, via the cloud manager, whether to move at least one LUN from the first data storage array.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
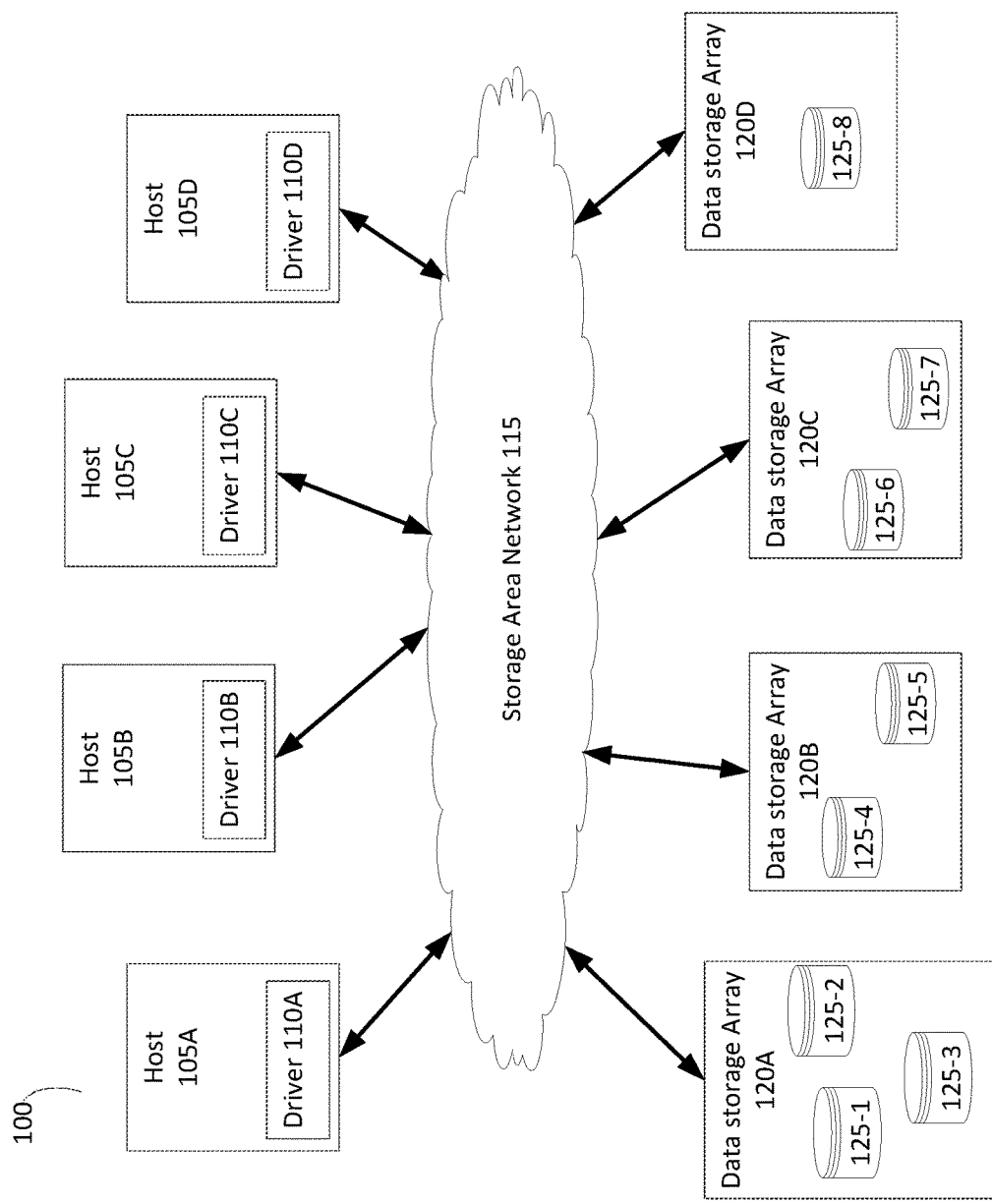
FIG. 1 is a simplified illustration of a cloud data storage system, in accordance with an embodiment of the present disclosure.

Traditionally, both public and private use of cloud data storage systems has been growing. Typically, management of performance of cloud data storage systems is a manual process. Generally, individual systems within a cloud data storage system are monitored for performance issues and reconfigured as needed on an individual basis. Conventionally, improvements to methods of managing cloud data storage systems would be beneficial to the data storage industry.

Automated Load Balancing for Cloud Systems

In many embodiments, the current disclosure may enable automatic management and/or load balancing of Input/Output (I/O) workloads in a cloud data storage system. In various embodiments, the current disclosure may enable monitoring of each of the plurality of data storage arrays within a cloud data storage system. In certain embodiments, the current disclosure may enable migration of one or more LUNs/Devices to balance I/O workloads among each of the data storage arrays within a cloud data storage system. In other embodiments, the current disclosure may enable minimizing direct user management of a cloud data storage system.

In most embodiments, a cloud data storage system may include a plurality of host nodes and a plurality of data storage arrays. In various embodiments, each of the host nodes and/or data storage arrays may be connected by one or more switches (Fibre Channel, iSCSI, etc.). In certain embodiments, the one or more switches may be configured to create one or more storage area networks (SAN) and/or fabrics connecting each of the Hosts and/or data storage arrays. In some embodiments, a cloud data storage system may include a cloud manager for managing workloads among each of the data storage arrays. In various embodiments, a cloud manager may be a single module and/or system connected to each of the hosts, data storage arrays, and/or switches to monitor, manage, and/or reconfigure the cloud data storage system. In some embodiments, a cloud manager may be modules distributed on each of the plurality of hosts within the cloud data storage systems. In certain embodiments, a cloud manager may be a combination of a standalone module and modules on each of the plurality of hosts within the cloud data storage systems.

In many embodiments, a cloud manager may be enabled to directly communicate each of the plurality of data storage arrays. In some embodiments, a cloud manager may be enabled to send vendor unique SCSI commands to retrieve I/O Load information from each of the plurality of cloud data storage systems. In certain embodiments, a cloud manager may be enabled to configure and/or reconfigure a data storage array to be enabled to receive one or more devices from another data storage array during a process of balancing I/O loads among data storage arrays within a cloud data storage system. In some embodiments, a cloud manager may be enabled to model whatif situations if one or more LUNs/Devices are migrated from a current data storage array to another data storage array. In most embodiments, a cloud manager may be enabled to optimize distribution of LUNs/Devices among the plurality of data storage arrays to have a balanced I/O load among the plurality of data storage arrays.

In many embodiments, a host in a cloud data storage system may be zoned to multiple arrays, so that a host driver may be enabled to communicate with at least one LUN on one or more arrays. In various embodiments, a host may be in communication with at least one LUN on each data storage array within a cloud data storage system. In many embodiments, a host may be enabled to track performance of a device it manages and may be enabled to make decisions on whether the device's performance may have dropped beyond a specified threshold. In various embodiments, with cloud management distributed throughout a cloud data storage system, a host may be enabled to implement a decentralized cloud management that may be enabled to linearly scale with the cloud data storage system's growth.

In most embodiments, if a performance issue is detected, a host application may communicate the performance issue to a cloud manager. In various embodiments, a cloud manager may be responsible for managing multiple entities within the cloud data storage system. In certain embodiments, the cloud manager may be enabled to check where an issue originates from, such as from the SAN, a data storage array, and/or Host. In most embodiments, a cloud manager may be enabled to make a decision as to whether a LUN or Device may be moved to a different data storage array (zoned to the same host as the source data storage array is zoned to).

In many embodiments, a cloud manager may be enabled to configure required resources on a target data storage array, when it is determined that a LUN and/or device may need to be moved between data storage arrays. In various embodiments, a host may be enabled to setup a seamless migration session between the LUN with performance problems and a new LUN created. In some embodiments, a host system may be enabled to use a host based seamless migration. In other embodiments, data storage arrays may be enabled to execute an array to array seamless migration. In most embodiments, migration of one or more LUNs and/or devices may be enabled to completed without disrupting application I/Os. In various embodiments, a host and/or cloud manager may be enabled to continue monitoring LUN performance and may be enabled to make future decisions to refine configuration to improve overall cloud data storage system performance. In most embodiments, a cloud manager may be enabled to use an anti-trashing/low pass filter decision algorithm to guard against transitory load that should not prompt a LUN and/or Device move. In various embodiments, a cloud manager may be enabled to monitor one or more LUNs and/or Devices over a period of time to determine whether performance issues are persistent or temporary.

Refer to the example embodiment of FIG. 1. FIG. 1 is a simplified illustration of a cloud data storage system, in accordance with an embodiment of the present disclosure. Cloud data storage system (system) 100 includes Hosts (105A-D, 105 Generally), Data storage arrays (120A-D, 120 Generally), and Storage area network (SAN) 115. In many embodiments, a SAN may be comprised of multiple smaller SANs and/or other networking divisions that may zone and/or separate hosts and/or data storage arrays from other hosts and/or data storage arrays within the system 100. Each of the hosts 105 includes a driver (110A-D, 110 Generally) which enables each of the hosts 105 to communicate with one or more of the data storage arrays 120. Each of the data storage arrays 120 includes one or more Devices (125-1 . . . 8, 125 Generally).

Figure 2:
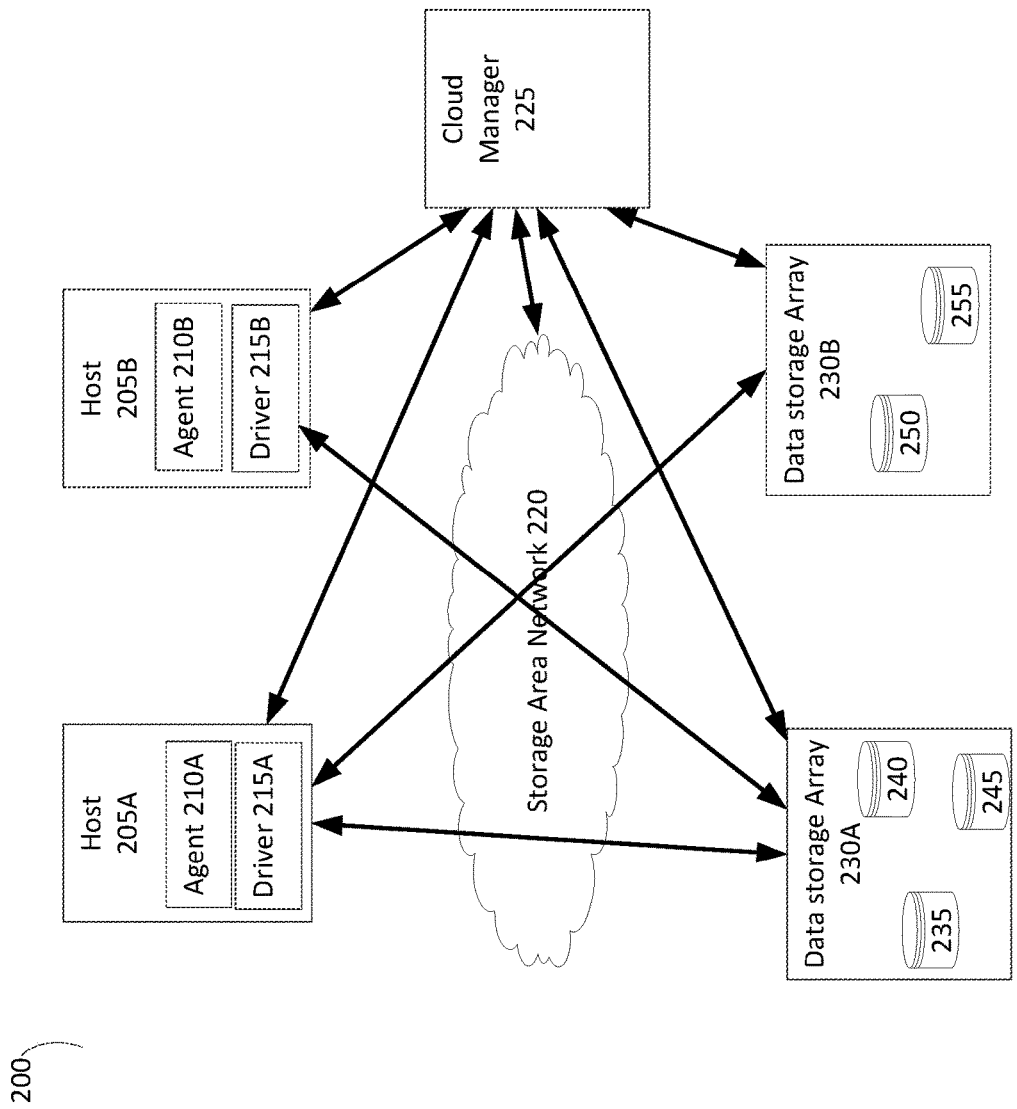
FIG. 2 is a simplified illustration of a cloud data storage system using a cloud manager, in accordance with an embodiment of the present disclosure.

Refer to the example embodiment of FIG. 2. FIG. 2 is a simplified illustration of a cloud data storage system using a cloud manager, in accordance with an embodiment of the present disclosure. Cloud data storage system (system) 200 includes Hosts (205A-B, 205 Generally), Data storage arrays (230A-B, 230 Generally), Storage area network (SAN) 220, and cloud manager 225. While Hosts 205, data storage arrays 230, and cloud manager 225 are connected to each other through SAN 220, for simplicity, the direct connections between hosts 205, arrays 230, and the cloud manager 225 are shown by the arrows. Hosts 205 include Agent (210A-B, 210 Generally) and driver (215A-B, 215 Generally). Drivers 215 enable communication with data storage arrays 230. In many embodiments, the drivers 215 are enabled to communicate SCSI commands to send and receive data I/Os and/or other information from each of the data storage arrays 230.

Each of the Agents 210 are enabled to query the data storage arrays 230 to determine I/O workloads for each data storage array the associated host is in communication with. For example, in this embodiment, Host 205A is in communication with Data storage array 230A and data storage array 230B. Specifically, host 205A is enabled to use devices 235, 240, 245, 250,255. Agent 210A, on host 205A, is enabled to query I/O loads from data storage array 230A and data storage array 230B using driver 215A. Agent 210B, on host 205B, is enabled to query I/O loads from data storage array 230A using driver 215B. Agents 210 are enabled to model whatif scenarios of whether devices 235, 240, 245, 250,255 in relation to I/O load on each of the data storage arrays 230. Agents 210 are enabled to determine whether one or more of devices 235, 240, 245, 250,255 have performance issues Agents 210 are enabled to communicate any performance issues to cloud manager 225. Cloud manager 225 is enabled to configure and/or reconfigure data storage arrays 230 to receive one or more devices from another data storage array. Cloud manager 225 is enabled to initiate a migration of one or more of devices 235, 240, 245, 250,255 to another data storage array. Cloud manager 225 is enabled to continue monitoring one or more of devices 235, 240, 245, 250,255 upon notification that a device has performance issues. In many embodiments, a cloud manager may be enabled to monitor a device over time to determine whether performance issues are temporary or persistent. In various embodiments, a cloud manager may migrate a device that has persistent issues to prevent trashing and/or thrashing of devices that may encounter temporary performance issues.

Figure 3:
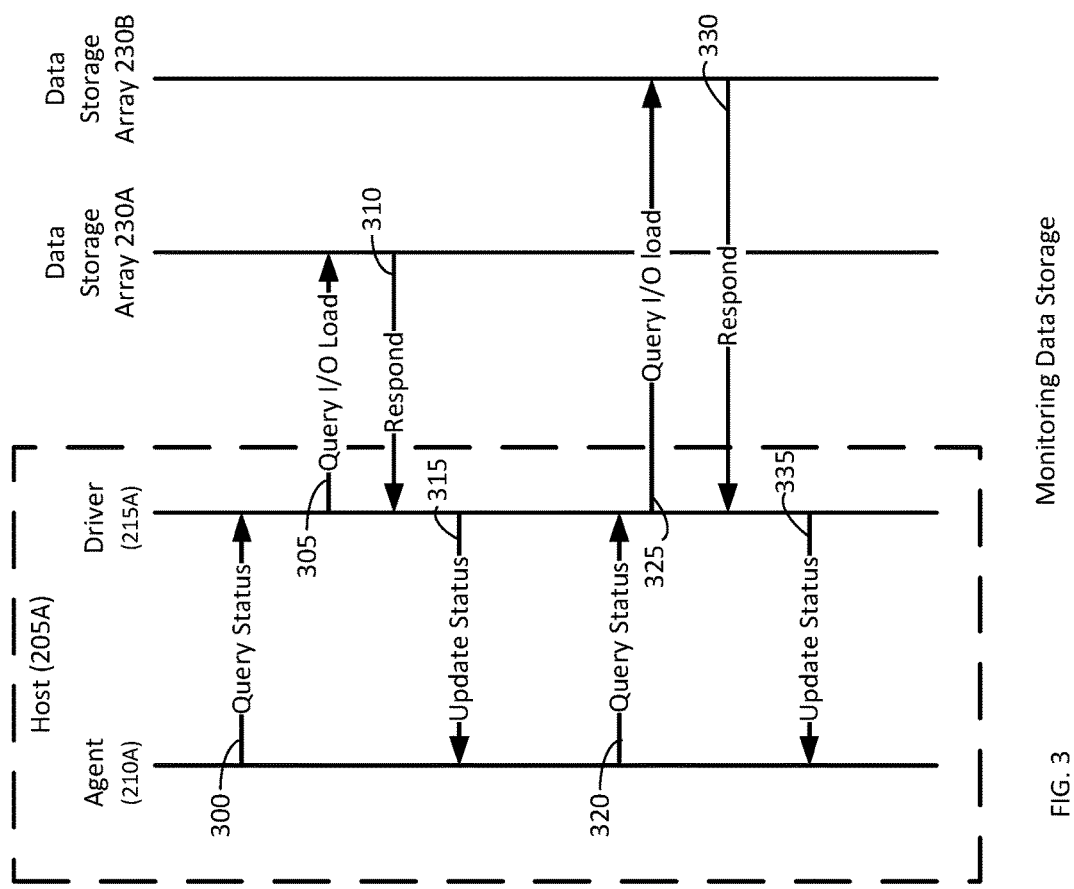
FIG. 3 is a simplified state diagram of a method of load balancing a cloud data storage system as shown in FIG. 2, in accordance with an embodiment of the present disclosure.

Refer to the example embodiments of FIGS. 2 and 3. FIG. 3 is a simplified state diagram of a method of load balancing a cloud data storage system as shown in FIG. 2, in accordance with an embodiment of the present disclosure. As shown in FIG. 2, Cloud data storage system (system) 200 includes Hosts (205A-B, 205 Generally), Data storage arrays (230A-B, 230 Generally), Storage area network (SAN) 220, and cloud manager 225. Agent 210A queries the status of data storage array 230A using Driver 215A (Step 300). Driver 215A sends a vendor unique SCSI command to Data storage array 230A to determine an I/O load of devices 235, 240, 245 on data storage array 230A (Step 305). Data storage array 230A responds to Driver 215A with an I/O load for each of devices 235, 240, 245 (Step 310) and Driver 215 updates agent 210A with the received information (Step 315). Agent 210A queries the status of data storage array 230B using Driver 215A (Step 320). Driver 215A sends a vendor unique SCSI command to Data storage array 230B to determine an I/O load of devices 250, 255 on data storage array 230B (Step 325). Data storage array 230B responds to Driver 215A with an I/O load for each of devices 250, 255 (Step 330) and Driver 215 updates agent 210A with the received information (Step 335). Agent 210A continually monitors data storage array 230A and data storage 230B to determine whether performance issues arise.

Figure 4:
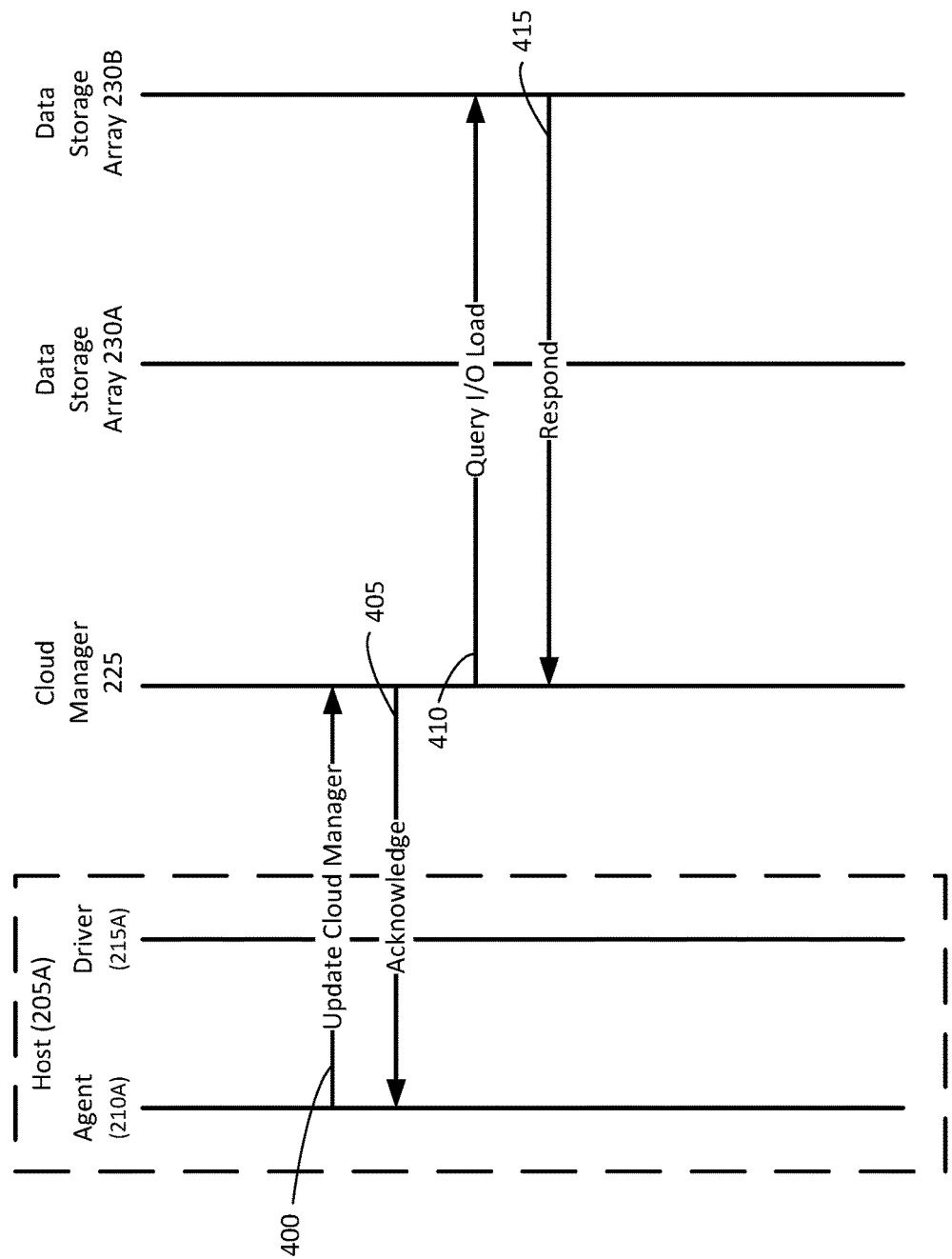
FIG. 4 is an alternate simplified state diagram of a method of load balancing a cloud data storage system as shown in FIG. 2, in accordance with an embodiment of the present disclosure.

Refer to the example embodiments of FIGS. 2 and 4. FIG. 4 is an alternate simplified state diagram of a method of load balancing a cloud data storage system as shown in FIG. 2, in accordance with an embodiment of the present disclosure. In this embodiment, upon agent 210A detecting a performance issue in data storage array 230B, agent 210A updates cloud manager 225 (Step 400). Cloud manager 225 acknowledges the update (Step 405) and identifies Data Storage Array 230B to be monitored. Cloud manager 225 periodically queries Data Storage Array 230B (Step 410) for an I/O load of devices 250, 255. Data Storage Array 230B respond with the requested information in message 415. Cloud manager 225 monitors data storage array 230B for a window of time to determine whether the performance issues are persistent or temporary. If the performance issues are persistent, the cloud manager 225 is enabled to modify the configuration of data storage system 230 to balance I/O loads in the system 200.

Figure 5:
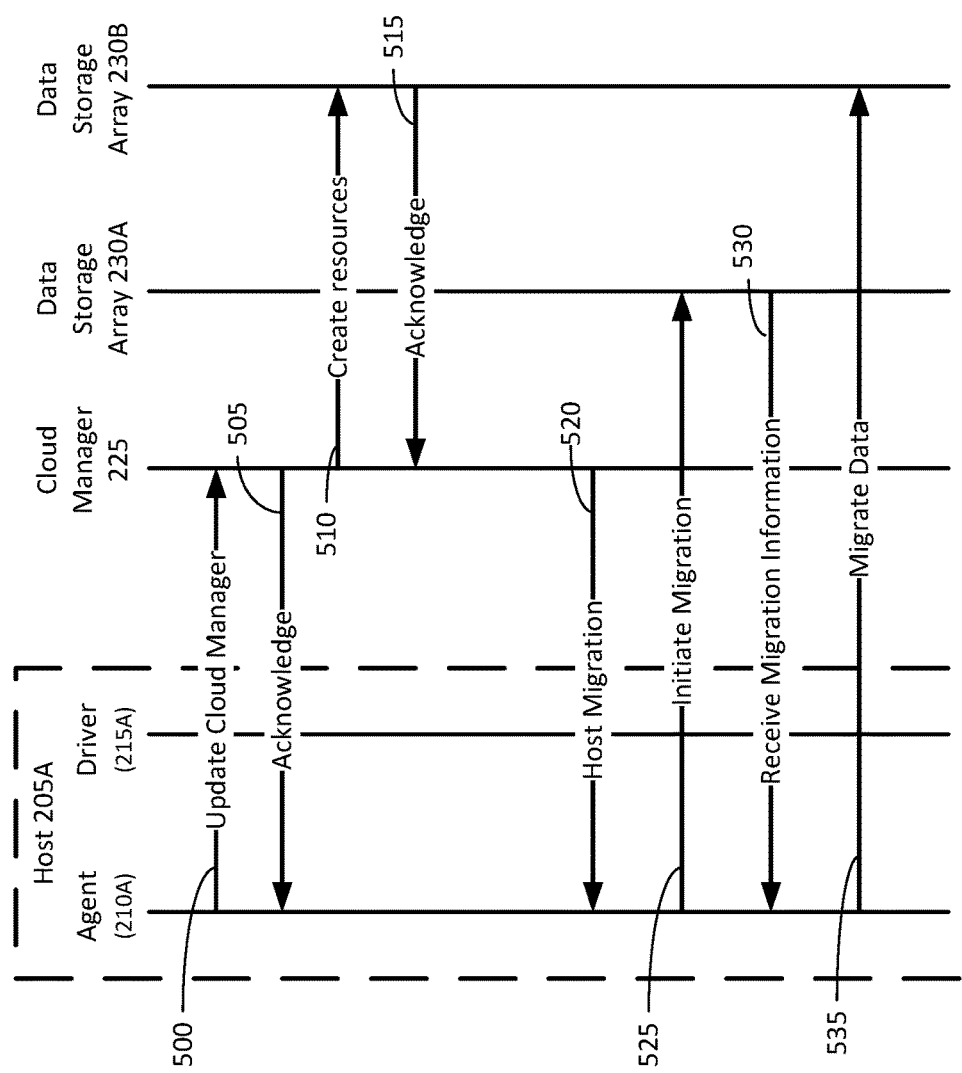
FIG. 5 is a further alternate simplified state diagram of a method of updating a configuration of the cloud data storage system shown in FIG. 2, in accordance with an embodiment of the present disclosure.

Refer to the example embodiments of FIGS. 2 and 5. FIG. 5 is a further alternate simplified state diagram of a method of updating a configuration of the cloud data storage system shown in FIG. 2, in accordance with an embodiment of the present disclosure. In this embodiment, Agent 210A has detected a performance issue with data storage array 230A.

Agent 210A updates the cloud manager 225 (Step 500) regarding the performance issue. Cloud Manager 225 acknowledges the update (Step 505) and analyzes the reported performance issue of data storage array 230A. Cloud manager 225 analyzes information received from agent 210A and determines that data storage array 230A has a persistent performance issue related to device 235. In many embodiments, the cloud manager 225 may monitor device 235 on data storage array 230A over a period of time to determine whether the device 235 actually has a performance issue. The cloud manager 225 may be enabled to determine whether the device 235 has a performance issue based on latency, I/O load, device response time, and/or other indicators being below a threshold level.

Upon determining that data storage array 230A has a performance issue, cloud manager 225 analyzes system 200 to determine which other data storage arrays 230 have less of an I/O load. Cloud manager 225 determines that data storage array 230B has a lower level of I/O load and cloud manager 225 creates resources on data storage array 230B enabled to receive data within device 235 (Step 510). Data array 230B creates the requested resources, which may include creating one or more devices and/or configuring data storage array 230B, and acknowledges that the resources are created (Step 515). Upon allocating resources, Cloud manager 225 communicates to agent 210A to initiate a host migration (Step 520). Agent 210A initiates a host migration by requesting data from data storage array 230A using driver 215A (Step 525). Data Storage Array 230A responds with data from device 235 (Step 530) and migrates the data to the data storage array 230B (Step 535).

Figure 6:
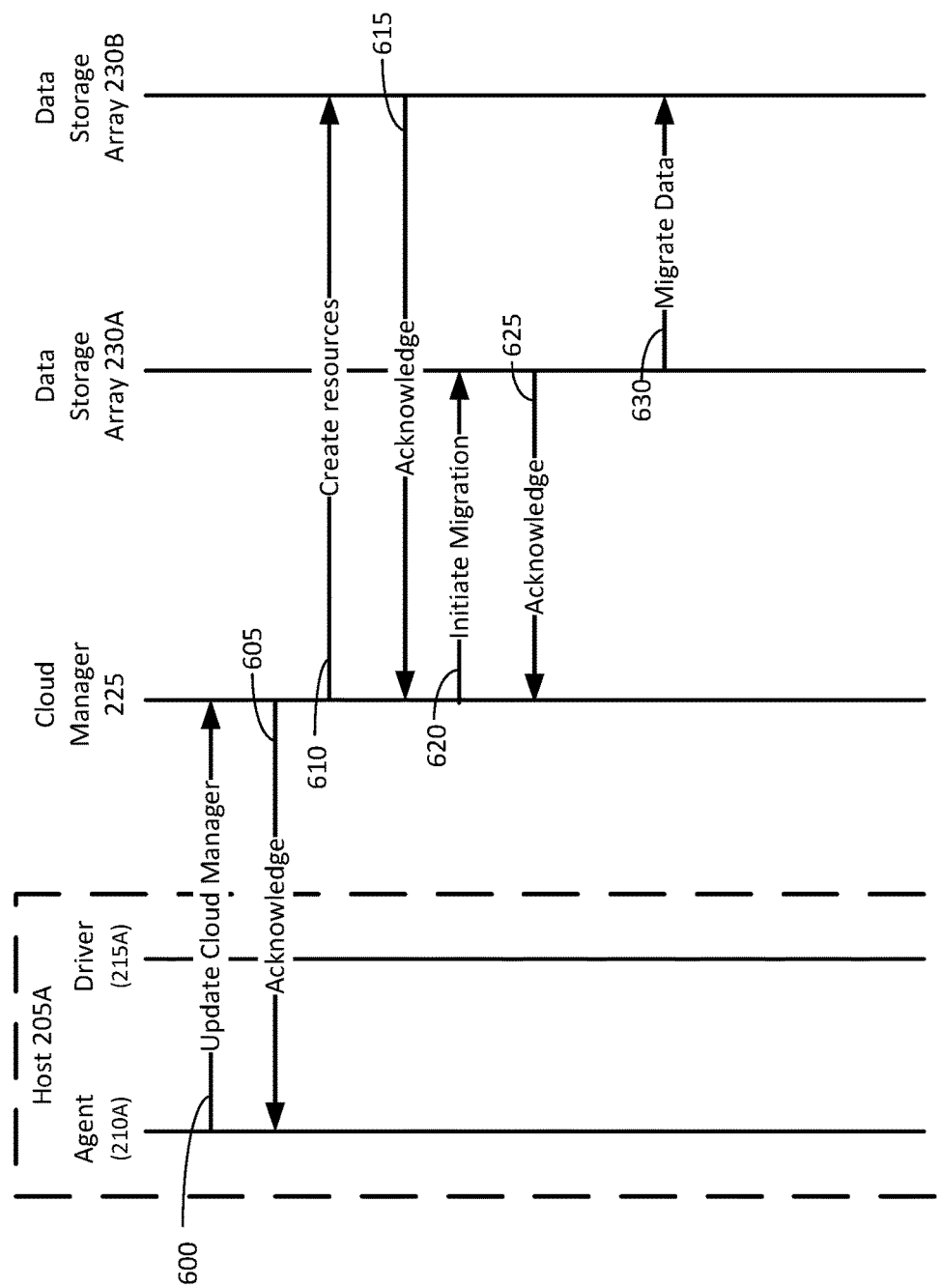
FIG. 6 is an alternate simplified state diagram of a method of updating a configuration of the cloud data storage system shown in FIG. 2, in accordance with an embodiment of the present disclosure.

Refer to the example embodiments of FIGS. 2 and 6. FIG. 6 is an alternate simplified state diagram of a method of updating a configuration of the cloud data storage system shown in FIG. 2, in accordance with an embodiment of the present disclosure. In this embodiment, Agent 210A has detected a performance issue with device 240 on data storage array 230A. The Agent 210A updates the cloud manager (Step 600) regarding the performance issue with device 240. The cloud manager 225 acknowledges the update (Step 605) and analyzes the data related to the performance issue and determines that Device 240 should be migrated from data storage array 230A to data storage array 230B. The Cloud Manager configures resources on data storage array 230B to enable data storage array 230B to accept data from device 240 (Step 610). The data storage array 230B completes the configuration changes and acknowledges the cloud manager's 225 request (Step 615). Cloud manager 225 initiates migration of data from data storage array 230A (Step 620). Data storage array 230A acknowledges the request (Step 625) and migrates the data from device 240 to data storage array 230B (Step 630). During the migration process, a host and/or user is enabled to access data from device 240. In many embodiments, the cloud manager may be enabled to update the driver's reference to a migrated device from the old location to the current location of the migrated device.

Figure 7:
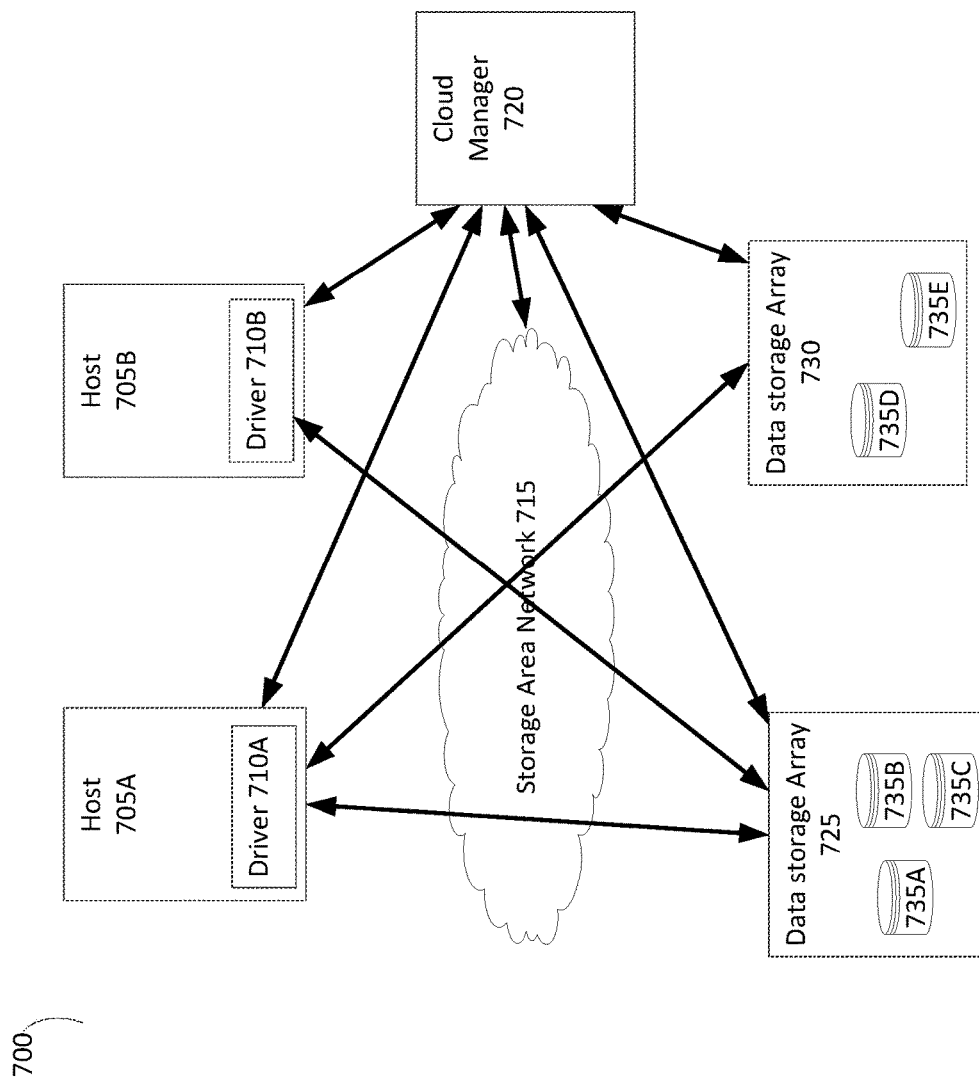
FIG. 7 is an alternate simplified illustration of a cloud manager managing a cloud data storage system, in accordance with an embodiment of the present disclosure.

Refer to the example embodiment of FIG. 7. FIG. 7 is an alternate simplified illustration of a cloud manager managing a cloud data storage system, in accordance with an embodiment of the present disclosure. The cloud data storage system (system) 700 includes hosts (705A-B, 705 Generally), data storage array 725, data storage array 730, cloud manager 720, and storage area network 715. In this embodiment, hosts 705 include drivers (710A-B, 710 Generally) which enable each of the hosts 705 to communicate with the data storage arrays 725, 730. Data storage array 725, 730 includes devices (735A-D, 735 Generally). SAN 715 enables hosts 705, data storage arrays 725, 730, and cloud manager 720 to communicate.

In this embodiment, the cloud manager 720 is a single entity that is enabled to monitor, analyze, and/or re-configure one or more portions of the system 700. The Cloud manager 720 is enabled to communicate with each of the data storage arrays 725 to determine whether there are performance issues with any of the devices on data storage arrays 725, 730. Cloud manager 720 is enabled to modify SAN 715 and/or re-configure data storage arrays 725, 730 to alleviate performance issues. Specifically, in many embodiments, the cloud manager 720 may migrate devices between data storage arrays if performance issues are found. In other embodiments, a cloud manager may re-configure a SAN to optimize I/O and/or other traffic through a SAN. In this embodiment, upon reconfiguring any of data storage arrays 725, 730, cloud manager 720 is enabled to update drivers 710 as to the current location of any of the devices 735 used by hosts 705.

Figure 8:
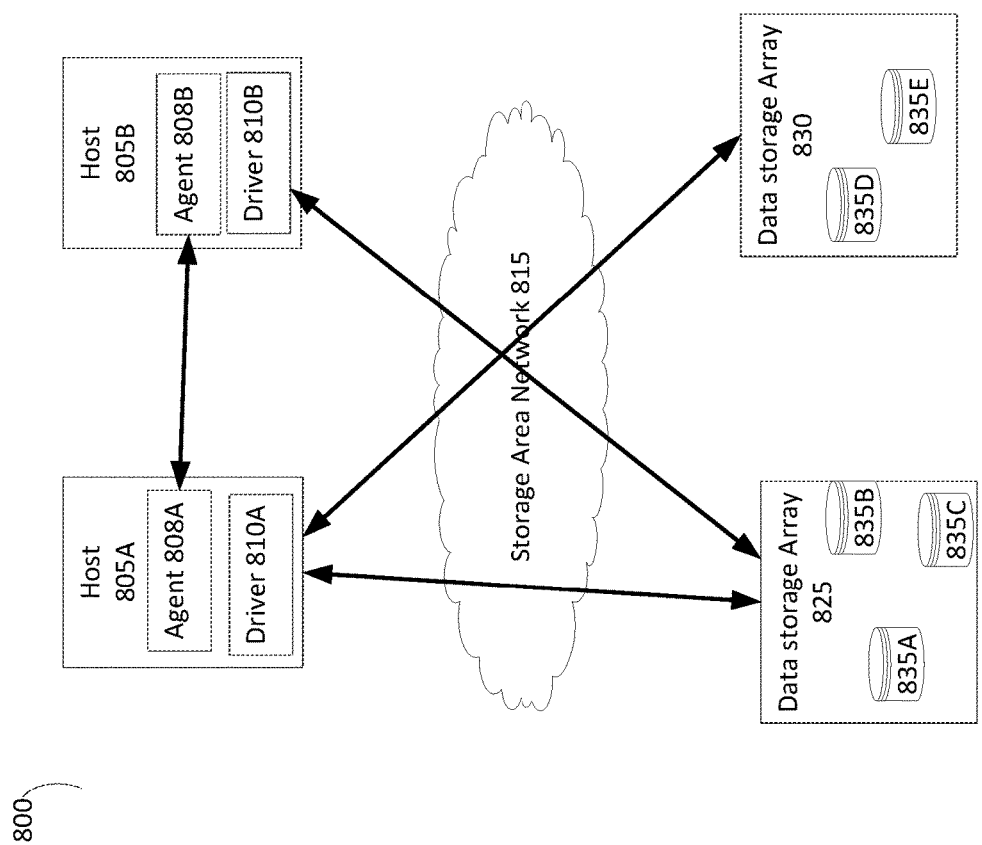
FIG. 8 is a further alternate simplified illustration of managing a cloud data storage system, in accordance with an embodiment of the present disclosure.

Refer to the example embodiment of FIG. 8. FIG. 8 is a further alternate simplified illustration of managing a cloud data storage system, in accordance with an embodiment of the present disclosure. Cloud data storage system (system) 800 includes hosts (805A-B, 805 Generally) and data storage arrays 825, 830. Each of the data storage arrays 825, 830 includes devices (835A-E, 835 Generally) which are enabled to be used by users and/or hosts 805. Each host includes an agent (808A-B, 808 Generally) and a driver (810A-B, 810 Generally). Drivers 810 enable their respective host 805 to communicate with data storage arrays 825, 830. Hosts 805 and data storage arrays 825, 830 are connected through storage area network 815.

In this embodiment, Agent 808A and Agent 808B are enabled to communicate. Each respective agent 808 is enabled to monitor data storage arrays in communication with each respective agent 808. For example, Agent 808A is enabled to communicate, monitor, and/or manage data storage array 825 and data storage array 830. Agent 808B is only enabled to communicate, monitor, and/or manage data storage array 825. However, as Agent 808A and agent 808B are enabled to communicate, Agent 808B may be enabled to affect Data storage array 830 through Agent 808A. In this embodiment, each agent 808 is enabled to monitor performance of the data storage arrays 825, 830. The Agent 808 is enabled to query the data storage arrays 825, 830 to determine I/O loads and/or whether or not one or more of devices 835 are experiencing performance issues during use. Upon determination of a performance issue, an agent is enabled to re-configure devices 835 on data storage arrays 825, 830 to facilitate migration of one or more of devices 835 to enable I/O load balancing among each of the data storage arrays 825, 830.

Figure 9:
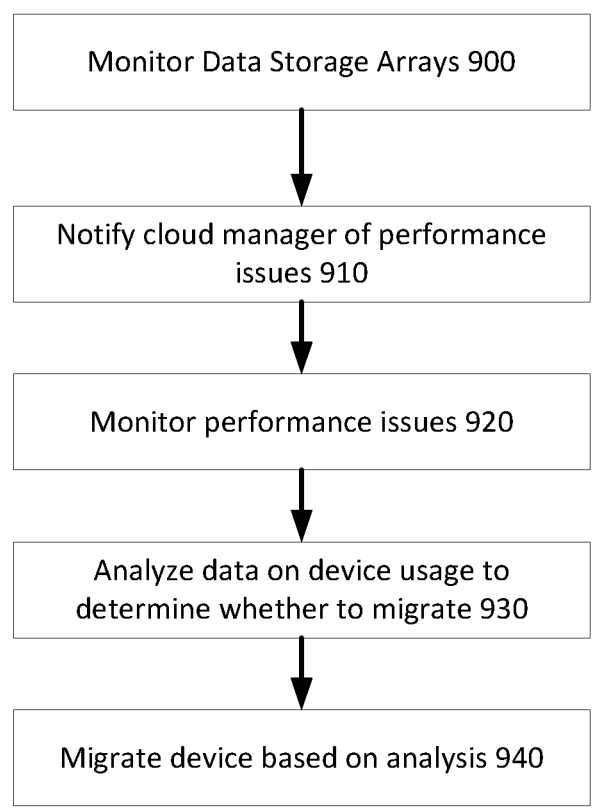
FIG. 9 is a simplified flowchart of a method of managing I/O loads in a cloud data storage system as shown in FIG. 2, in accordance with an embodiment of the present disclosure.

Refer to the example embodiments of FIGS. 2 and 9. FIG. 9 is a simplified flowchart of a method of managing I/O loads in a cloud data storage system as shown in FIG. 2, in accordance with an embodiment of the present disclosure. As shown in FIG. 2, Cloud data storage system (system) 200 includes Hosts (205A-B, 205 Generally), Data storage arrays (230A-B, 230 Generally), Storage area network (SAN) 220, and cloud manager 225. Agent 210A monitors both data storage array 230A and data storage array 230B (Step 900). In this embodiment, Agent 210A determines that there is a performance issue with device 245 on data storage array 230A. Agent 210A notifies cloud manager 225 of the performance issue (Step 910). Cloud manager 225 monitors the performance issues of device 245 by communicating with data storage array 230A, SAN 220, and agent 210A on host 205A (Step 920). Cloud manager 225 analyzes data received related to the performance issue and determines whether to migrate device 245 to data storage array 230B or other data storage arrays within system 200. Cloud manager 225 determines that device 245 should be migrated to data storage array 230B and configures data storage array 230B to receive device 245. Cloud manager 225 then initiates a migration of device 245 to data storage array 230B (Step 940).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
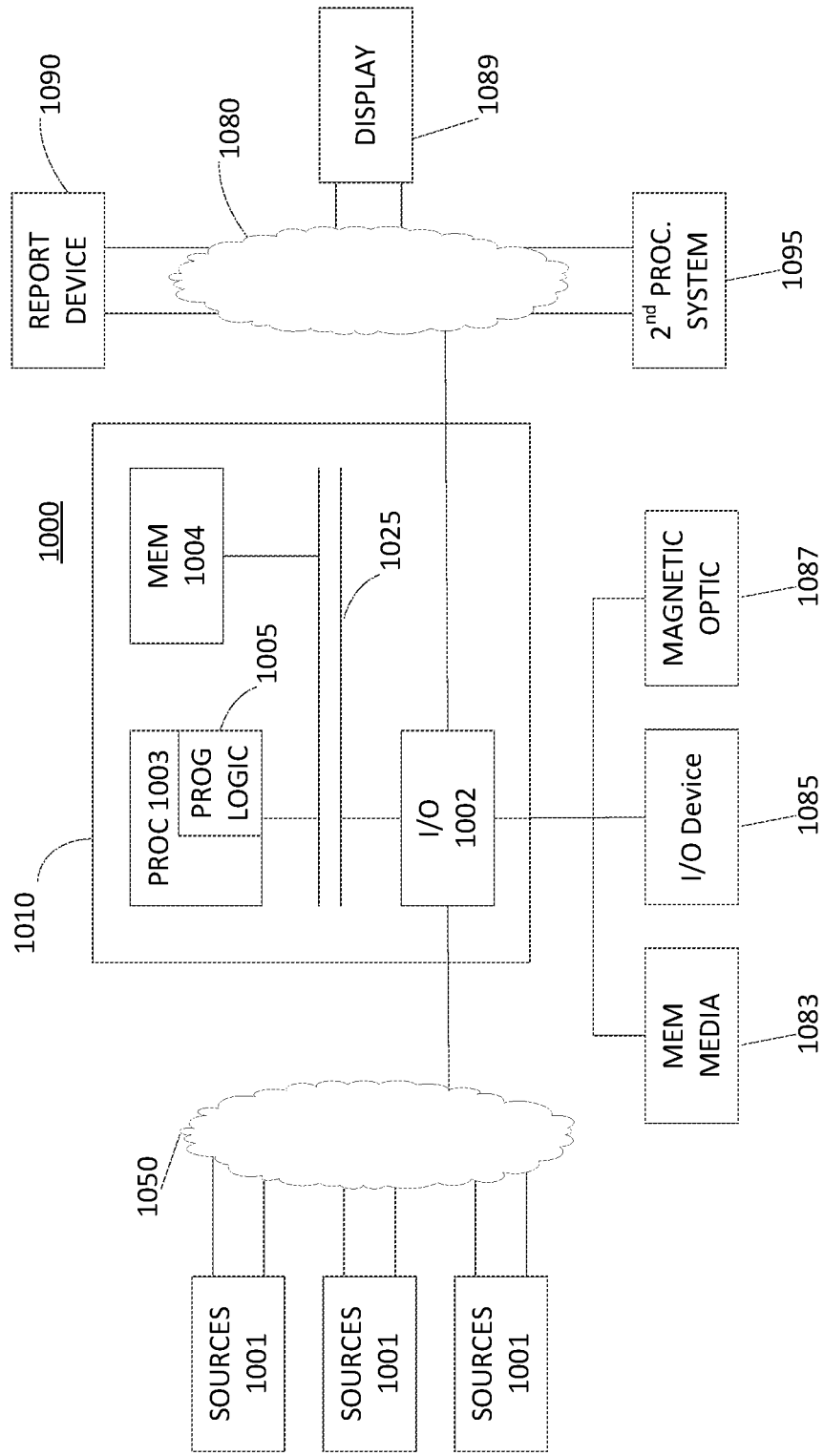
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic drives, optical drives, or Solid State Drives (SSD). When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
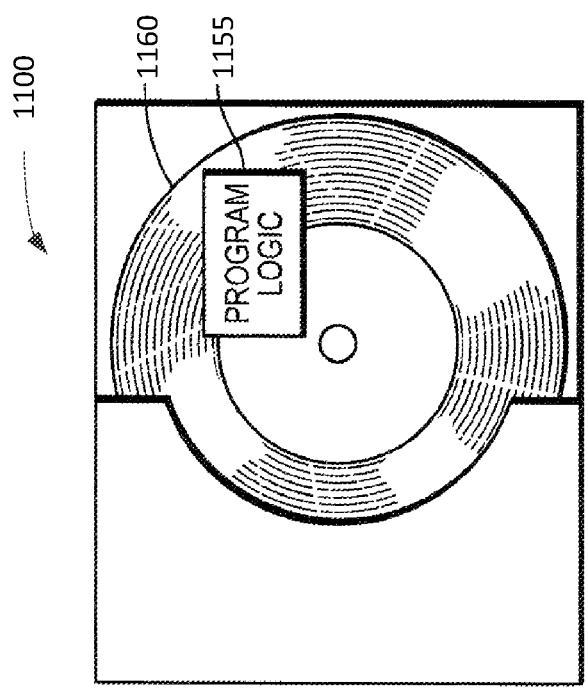
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of balancing Input/Output (I/O) loads for cloud data storage systems including a plurality of hosts and a plurality of data storage arrays, each host being configured to communicate with the plurality of data storage arrays, the computer-executable method comprising:
   monitoring, via a first host of the plurality of hosts, a performance level corresponding to each of the plurality of data storage arrays;
   upon detecting an underperforming data storage array a performance issue with the first data storage array, determining if the underperforming data storage array has fallen below a threshold performance level;
   in the event the underperforming data storage array has fallen below a threshold performance level, notifying a cloud manager, the cloud manager communicatively coupled to the plurality of hosts and the plurality of data storage arrays, that the underperforming data storage array has fallen below the threshold performance level;
   determining by the cloud manager whether to replace the underperforming data storage array with a replacement data storage array chosen by the cloud manager form among the plurality of data storage arrays based on the performance level of the replacement data storage array;
   seamlessly replacing the underperforming data storage array without interrupting service IOs by reconfiguring the replacement data storage array to replace the underperforming data storage array.

2. A system, comprising:
   a cloud data storage system including a plurality of hosts and a plurality of data storage arrays, each host configured to communicate with the plurality of data storage arrays; and
   computer-executable program logic encoded in memory of one or more computers enabled to manage balancing Input Output (I/O) loads for the cloud data storage system, wherein the computer-executable program logic is configured for the execution of:
   monitoring, via a first host of the plurality of hosts, a performance level corresponding to each of the plurality of data storage arrays;
   upon detecting an underperforming data storage array a performance issue with the first data storage array, determining if the underperforming data storage array has fallen below a threshold performance level;
   in the event the underperforming data storage array has fallen below a threshold performance level, notifying a cloud manager, the cloud manager communicatively coupled to the plurality of hosts and the plurality of data storage arrays, that the underperforming data storage array has fallen below the threshold performance level;
   determining by the cloud manager whether to replace the underperforming data storage array with a replacement data storage array chosen by the cloud manager form among the plurality of data storage arrays based on the performance level of the replacement data storage array;
   seamlessly replacing the underperforming, data storage array without interrupting service IOs by reconfiguring the replacement data storage array to replace the underperforming data storage array.

3. A computer program product for balancing Input/Output (I/O) loads for cloud data storage systems including a plurality of hosts and a plurality of data storage arrays, each host being configured to communicate with the plurality of data storage arrays, the computer program product comprising:
   a non-transitory computer readable medium encoded with computer-executable code, the code configured to enable the execution of:
   monitoring, via a first host of the plurality of hosts, a performance level corresponding to each of the plurality of data storage arrays;
   upon detecting an underperforming data storage array a performance issue with the first data storage array, determining if the underperforming data storage array has fallen below a threshold performance level;
   in the event the underperforming data storage array has fallen below a threshold performance level, notifying a cloud manager, the cloud manager communicatively coupled to the plurality of hosts and the plurality of data storage arrays, that the underperforming data storage array has fallen below the threshold performance level;
   determining by the cloud manager whether to replace the underperforming data storage array with a replacement data storage array chosen by the cloud manager form among the plurality of data storage arrays based on the performance level of the replacement data storage array;
   seamlessly replacing the underperforming data storage array without interrupting service IOs by reconfiguring the replacement data storage array to replace the underperforming data storage array.

4. The method of claim 1 wherein the cloud manager uses an anti-thrashing/low pass filter algorithm when determining whether to replace the underperforming data storage array.

5. The system of claim 2 wherein the cloud manager uses an anti-thrashing/low pass filter algorithm when determining whether to replace the underperforming data storage array.

6. The computer program product of claim 3 wherein the cloud manager uses an anti-thrashing/low pass filter algorithm when determining whether to replace the underperforming data storage array.

* * * * *